United States Patent
Yudenfriend et al.

(10) Patent No.: US 7,702,879 B2
(45) Date of Patent: Apr. 20, 2010

(54) ASSIGNING ALIAS ADDRESSES TO BASE ADDRESSES

(75) Inventors: Harry Morris Yudenfriend, Poughkeepsie, NY (US); Matthew Joseph Kalos, Tucson, AZ (US); Richard Anthony Ripberger, Tucson, AZ (US); Kenneth M. Trowell, Poughkeepsie, NY (US); Dale Francis Riedy, Jr., Poughkeepsie, NY (US); Juan Alonso Coronado, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 11/299,089

(22) Filed: Dec. 8, 2005

(65) Prior Publication Data
US 2007/0136552 A1  Jun. 14, 2007

(51) Int. Cl.
*G06F 12/00* (2006.01)
(52) U.S. Cl. .............................. 711/201; 711/E12.013
(58) Field of Classification Search ........................ None
See application file for complete search history.

(56) References Cited

U.S. PATENT DOCUMENTS

| | | | | |
|---|---|---|---|---|
| 5,530,897 | A | * | 6/1996 | Meritt ........................... 710/9 |
| 5,640,591 | A | | 6/1997 | Rosenthal et al. |
| 5,678,056 | A | | 10/1997 | Nakamura |
| 5,974,519 | A | | 10/1999 | Cho |
| 6,167,459 | A | * | 12/2000 | Beardsley et al. ............... 710/3 |
| 6,170,023 | B1 | * | 1/2001 | Beardsley et al. ............. 710/36 |
| 6,185,638 | B1 | | 2/2001 | Beardsley et al. |
| 6,240,467 | B1 | | 5/2001 | Beardsley et al. |
| RE37,613 | E | | 3/2002 | Savage |
| 6,519,690 | B1 | | 2/2003 | Quimby |
| 6,678,748 | B2 | | 1/2004 | Fairchild et al. |
| 6,745,270 | B1 | | 6/2004 | Barenys et al. |
| 6,785,747 | B2 | | 8/2004 | Lehmann et al. |
| 6,829,657 | B1 | | 12/2004 | Lynn et al. |
| 6,832,283 | B2 | | 12/2004 | Boesinger et al. |

OTHER PUBLICATIONS

"zArchitecture Reference Summary", IBM Corporation, Document # SA22-7871-02, Sep. 2005.

* cited by examiner

*Primary Examiner*—Denise Tran
(74) *Attorney, Agent, or Firm*—David W. Victor; Konrad Raynes & Victor LLP

(57) ABSTRACT

Provided are a method, system, and article of manufacture for assigning alias addresses to base addresses. An assignment is provided of base addresses to the devices. The base addresses are used to access the devices assigned to the base addresses. An assignment is provided of a plurality of alias addresses to an alias address pool. The alias addresses in the alias address pool are capable of being dynamically assigned to the devices to service I/O requests to the devices. An Input/Output (I/O) request to access one target device comprising one of the devices is processed. A determination is made as to whether the base address assigned to the target device is available. One alias address is assigned to the target device in response to determining that the base address is not available. The I/O request is issued to the assigned alias address to transmit the request to the target device.

37 Claims, 8 Drawing Sheets

Host/Processing System UCB Info

Control Unit Address Information

Processing System Alias Storage Pool

Control Unit Alias Storage Pool

ASSIGNING ALIAS ADDRESSES TO BASE ADDRESSES

BACKGROUND OF THE INVENTION

1. Field of the Invention

The present invention relates to a method, system, and program for assigning alias addresses to base addresses.

2. Description of the Related Art

In certain computing environments, multiple host systems may communicate with multiple control units (CUs) (also known as storage controllers, storage subsystems, enterprise storage servers, etc.) providing access to storage devices, such as interconnected hard disk drives through one or more logical paths. The interconnected drives may be configured as a Direct Access Storage Device (DASD), Redundant Array of Independent Disks (RAID), Just a Bunch of Disks (JBOD), etc. The control unit may configure one or more logical subsystems (LSSs), where each LSS is configured to include multiple volumes.

The host system may include a channel subsystem that maintains information to access volumes in an LSS from the control unit. The channel subsystem includes subchannels, which provides state tracking for the execution of the I/O operations for the channel subsystem and provides information on paths connecting the host to a volume in an LSS. The host operating system maintains a unit control block (UCB) providing information on a base unit address assigned to one volume and the subchannel that the channel subsystem uses to access the volume on the base device. The channel subsystem is aware of individual subchannels and the paths they have. The customer initially assigns aliases to bases via external tools to the CU. The operating system can dynamically change the binding of aliases to bases given changes in the workload requirements. Further, the control unit may assign alias addresses to the base addresses for volumes, where the alias addresses are used to allow concurrent I/O requests to be directed to the same volume. The UCB for a base volume maintains information on the alias addresses assigned to that volume. The host processes the information in the UCB to address an I/O operation to a volume. In particular, the host initiates an I/O operation toward a volume by initiating a channel program which consists of a series of I/O instructions, such as a chain of channel command word (CCW) commands, at the subchannel.

The control unit maintains a different view of the system. The control unit is provided a base unit address for each device (volume) and zero or more alias unit addresses for each base unit address. After assigning a base address to each volume (device), the remaining addresses can be allocated as alias addresses to the base addresses. The control unit uses the unit addresses to physically access the volumes.

An I/O operation or chain of CCW commands can be simultaneously executed toward the same logical volume using the different base and alias unit addresses for the logical volume. In this way, the executed CCW commands are all directed toward the same logical volume using different addresses, wherein each address uses one of multiple channel paths to reach a single logical volume. This allows a single host to concurrently execute multiple I/O operations against a single volume. The number of aliases provided for a base may be set according to the size of the volume and the number of concurrent users. In certain cases, only a few aliases may be needed to accommodate network traffic for a particular base address for a volume. Further, the number of aliases associated with a logical volume may be dynamically changed by the Work Load Manager (WLM) based on the goals for the work load.

The host first attempts to access a volume (I/O device) through the base UCB for the volume. If the base UCB is unavailable, i.e., concurrently servicing another I/O operation, then the host may use one of the available alias UCBs assigned to that base UCB to concurrently access the volume. The host system then performs the I/O operations through the subchannel associated with the UCB and the channel paths provided for that subchannel. The use of alias addresses and reassigning alias addresses to different base addresses are described in U.S. Pat. Nos. 6,185,638, 6,170,023, and 6,167,459.

SUMMARY

Provided are a method, system, and article of manufacture for assigning alias addresses to base addresses. An assignment is provided of base addresses to the devices, wherein the base addresses are used to access the devices assigned to the base addresses. An assignment is provided of a plurality of alias addresses to an alias address pool. The alias addresses in the alias address pool are capable of being dynamically assigned to the devices to service I/O requests to the devices. An Input/Output (I/O) request to access one target device comprising one of the devices is processed. A determination is made as to whether the base address assigned to the target device is available. One alias address is assigned to the target device in response to determining that the base address is not available. The I/O request is issued to the assigned alias address to transmit the request to the target device.

In a further embodiment, the alias address assigned to the target device is unassigned in response to completing the I/O request and the unassigned alias address to the alias address pool for use with a subsequent I/O request to one of the devices.

In a further embodiment, assigning one alias address to the target device comprises associating the alias address with the base address of the target device.

In a further embodiment, assigning one alias address to the target device comprises issuing a command to a control unit managing access to the devices to assign the alias address to the target device. The control unit updates internal data structures to indicate the assignment of the alias address to the target device.

In a further embodiment, the devices comprise volumes configured within a logical subsystem. The host system includes independent processing systems. Each processing system maintains separate connections to a control unit managing access to the volumes and each processing system maintains a data structure indicating an assignment of base addresses to volumes and alias addresses to a storage pool. The storage pools used by the processing systems have the same alias addresses to access the volumes.

In a further embodiment, status is received indicating that the target device is reserved in response to issuing the I/O request to the assigned alias address. Subsequent I/O requests to the target device are queued in response to receiving the status.

In a further embodiment, status is received indicating that the target device is available and alias addresses from the storage pool are assigned to the target device to use for I/O requests queued for the target device in response to receiving status that the target device is no longer reserved.

In a further embodiment, the status indicating that the target device is available comprises status indicating that the base address for the target device is available. The I/O requests to the base address and the alias address that were delayed in response to receiving the status that the target device is no longer reserved are reissued.

In a further embodiment, the association of alias and base addresses with an alias address pool is determined by an assignment from the control unit of an alias assignment group number for each base or alias address. The base and alias addresses associated with the same alias management group number are associated with the same alias address pool.

In a further embodiment, the alias management group numbers identified by the control unit are subdivided into multiple subsets of the alias management group numbers to create multiple alias address pools.

Further provided are a method, system, and article of manufacture for assigning alias addresses to base addresses. Base addresses are assigned to the devices, wherein the base addresses are used by the host system to access the devices assigned to the base addresses. A plurality of alias addresses are assigned to an alias address pool, wherein the alias addresses in the alias address pool are capable of being dynamically assigned to the devices to service I/O requests to the devices. The assignment of base addresses to the target devices and the alias addresses to the alias address storage pool are communicated to the host system. A request is received from the host system to assign one alias address to a target device comprising one of the devices. The alias address indicated in the request is assigned to the target device in response to the request. An I/O request to the assigned alias address for the target device is received and the I/O request is executed against the target device to which the alias address is assigned.

In a further embodiment, the host system includes independent processing systems, each maintaining separate connections to the devices. Assigning the alias addresses to the alias address storage pool further comprises assigning to each processing system in the host system a set of alias addresses in the storage pool. The sets of alias addresses for different processing systems have the same alias addresses. Further, the set of alias addresses assigned to each processing system are communicated to each processing system.

In a further embodiment, a same or different alias addresses in different sets of alias addresses in the storage pool can be assigned to the processing systems associated with those sets to access one device or different devices.

In a further embodiment, the devices comprise volumes configured within a logical subsystem. Each processing system maintains a plurality of connections to the logical subsystem identified by a path group identifier. The operation of assigning one set of alias addresses to one processing system comprises associating the set of alias addresses with the path group identifier of the logical subsystem and processing system.

In a further embodiment, a determination is made as to whether one target device is inaccessible in response to receiving one I/O request to the alias address assigned to the target device. Status is returned to the host system initiating the received I/O request against the alias address indicating that the target device is inaccessible.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate the embodiments of the present invention. It is understood that other embodiments may be utilized and structural and operational changes may be made without departing from the scope of the present invention.

Figure 1:
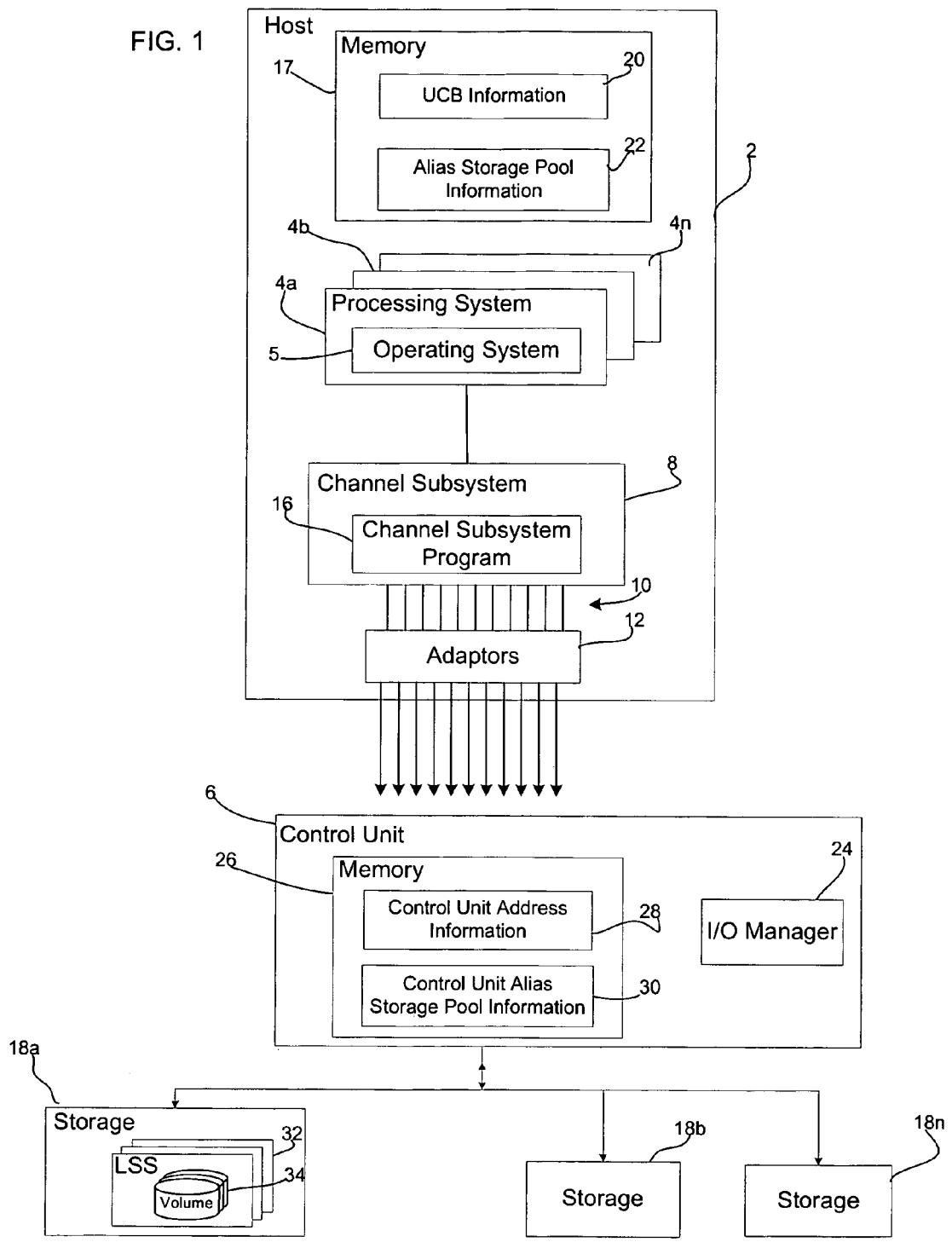
FIG. 1 illustrates an embodiment of a computing environment.

FIG. 1 illustrates a computing environment in which aspects of the invention are implemented. One or more hosts 2 (only one is shown) include one or more processing systems 4a, 4b . . . 4n that communicate Input/Output (I/O) requests to a control unit 6 through a channel subsystem 8 that provides a plurality of logical paths to the control unit 6. Each processing system 4a, 4b . . . 4n includes an operating system 5 to manage path related operations. The channel subsystem 8 manages logical paths 10 extending through adaptors 12. An adaptor provides the physical layer through which logical paths 10 extend to the control unit 6 or multiple control units through a switch (not shown). The operating system 5 may further associate multiple logical paths 10 with a path group, where all the paths in a path group may be used by one processing system 4a, 4b . . . 4n to communicate with the control unit 6. A path group used by one processing system 4a, 4b . . . 4n may be identified by a path group identifier (PGID). The operating system 5 may issue an I/O command (such as a Set Path Group ID CCW) to each path for the device using a world wide unique identifier (PGID). The control unit 6 creates a path group from the set of paths for a device that have the same identifier.

Each processing system 4a, 4b . . . 4n may comprise a central processing unit (CPU) executing programs, including the operating system 5 and channel subsystem 8 code. Alternatively, each processing system 4a, 4b . . . 4n may comprise one of multiple logical partitions (LPARs) that each operate as independent systems, executing their own operating system 5 and may share channel subsystem 8 code. In further embodiments, each processing system may comprise a logical partition of a processor. In this way, one or more processors in the host 2 may implement multiple logical partitions (LPARs). Multiple processing systems 4a, 4b . . . 4n may share a single logical channel subsystem 16 or different processing systems 4a, 4b . . . 4n may use different logical channel subsystems. Details of a channel subsystem implementing logical paths is described in the publication "z/Architecture: Reference Summary", IBM document no. SA22-7871-02 (Copyright IBM, September 2005).

The channel subsystem 8 includes a channel subsystem program 16 to perform the operations to communicate I/O requests from the processing systems 4a, 4b . . . 4n to the control unit 6. The operating system 5 uses UCBs and manages I/O requests. The channel subsystem program 16 obtains the I/O request from the channel subsystem 8. A memory 17, comprised of one or more memory devices, includes information used by the channel subsystem program 16 to manage I/O requests. Each processing system 4a, 4b . . . 4n maintains its own UCB and alias storage pool information providing information on the UCB chains for each processing system 4a, 4b . . . 4n. Different processing systems 4a, 4b . . . 4n may have different UCB chains having different alias addresses assigned to the base addresses for a particular processing system.

The host memory 17 further includes alias storage pool information 22 providing information on the assignment of available alias addresses for different logical subsystems (LSS) for the processing systems 4a, 4b . . . 4n, such that different processing systems 4a, 4b . . . 4n may be using and have available different alias addresses. Further, the different processing systems 4a, 4b . . . 4n may have available for use the same alias addresses, but use them differently, i.e., assign them in different configurations to the volumes and alias storage pool. In one embodiment, the memory 17 may maintain the UCB information 20 and alias storage pool information 22 for all processing systems 4a, 4b . . . 4n and LSSs, which is shared for all processing system operations at the same time. In a further embodiment, each processing system may maintain in its own memory the UCB information 20 and alias storage pool information 22 for that processing system 4a, 4b . . . 4n.

The control unit 6 manage requests from the processing systems 4a, 4b . . . 4n to access storage systems 18a, 18b . . . 18n, such as tracks, partitions, logical devices, logical volumes, logical unit numbers (LUNs), logical subsystems (LSS) or other logical or physical units of storage. Storage 18a shows a configuration including one or more LSSs 32, where one or more volumes 34 are configured in each LSS 32. The volumes may extend across multiple storage devices. The term "device" refers to any physical or logical data storage unit, such as a physical track, LSS, partition, logical volume, volume, etc. The control unit 6 includes an I/O manager program 24 to process I/O requests to the storages 18a, 18b . . . 18n and logical and physical components configured therein, e.g., volumes, LSSs, etc. The control unit 6 has a control unit memory 26, comprised of one or more devices, in which the I/O manager 24 maintains control unit address information 28 having the assignment of base and alias addresses for defined storage units, such as volumes within a logical subsystem (LSS). The memory 26 further includes control unit alias storage pool information 30 having information on the alias addresses available for the processing systems 4a, 4b . . . 4n.

The hosts 2 may comprise computational devices known in the art, such as a workstation, mainframe, server, etc. The control unit 6 may comprise a storage subsystem or server, such as an enterprise storage server, storage controller, etc., or other device used to manage I/O requests to attached volumes. The storages 18a, 18b . . . 18n may comprise storage devices known in the art, such as interconnected hard disk drives (e.g., configured as a DASD, RAID, JBOD, virtualized devices, etc.), magnetic tape, electronic memory, flash memory, optical disk, etc. The host 2 may communicate with the control unit 6 over the logical paths 10, which may extend through a network, such as a Local Area Network (LAN), Storage Area Network (SAN), Wide Area Network (WAN), peer-to-peer network, wireless network, etc. Alternatively, the host 2 may communicate with the storage controller 6 over a bus interface, such as a Peripheral Component Interconnect (PCI) bus or serial interface.

Figure 2:
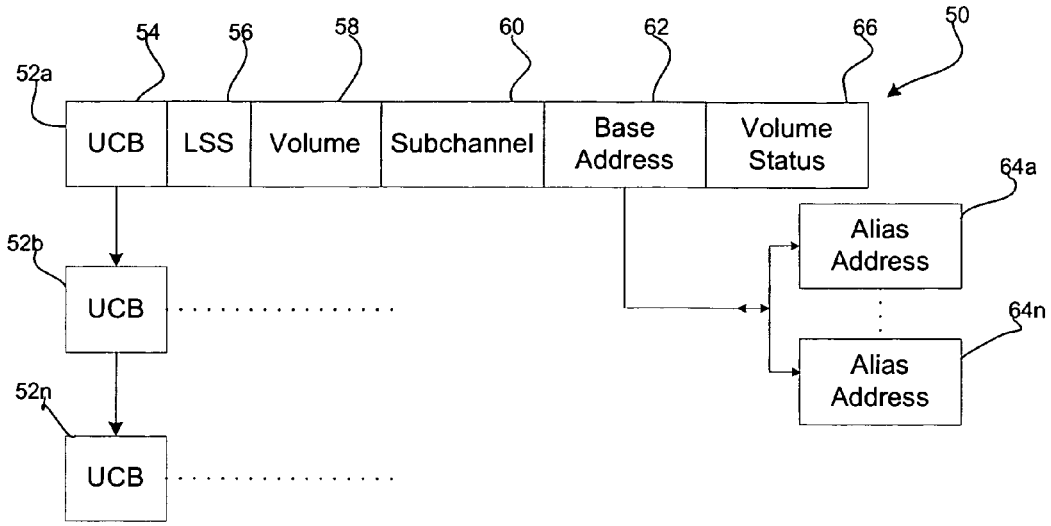
FIGS. 2 and 4 illustrate embodiments of information a host maintains to access volumes.

FIG. 2 illustrates host/processing system UCB information 50 having information on the assignment of base and alias addresses to the volumes for one processing system 4a, 4b . . . 4n and LSS 32. An instance of the information 50 would be maintained for each separate processing system 4a, 4b . . . 4n and LSS 32 pair in the host 2. The instances of the UCB information 50 comprise the UCB information 20. The information 50 includes UCB entries 52a, 52b . . . 52n for one processing system 4a, 4b . . . 4n, which includes for each UCB in the chain the following information: a UCB identifier 54 of a UCB providing information to access one volume configured in the storages 18a, 18b . . . 18; a logical subsystem (LSS) 56 identifying an LSS 32 in which the volume 34 is configured; a volume 58 in the LSS 32 identified in field 56 for which the information is provided; a subchannel 60 of the channel subsystem 8 comprising a subchannel number, index or pointer providing information on the volume; a base address 62 for the subchannel; and one or more alias addresses 64a . . . 64n used to additionally address the volume (if any have been assigned); and volume status 66 providing information on the status of the volume. In certain embodiments, alias addresses are only associated with a specific base address 62 when an I/O operation is active for that base (volume). Otherwise the aliases reside in a pool of available aliases not associated with any specific base (volume).

In one embodiment, alias addresses may be initially associated with bases in the storage subsystem (LSS) of the control unit 6. If the storage subsystem supports the alias address pooling, then the operating system 5 issues a "set subsystem characteristics command" to tell the control unit 6 to operate in a mode where alias addresses are pooled and assigned only when needed. This command causes the alias addresses to no longer be associated with a specific base address 62 for that processing system 4a, 4b . . . 4n. Each operating system in a processing system 4a, 4b . . . 4n can change their alias addressing modes independently. At this point, the alias addresses are available to be assigned to a base address 62 as I/O operations are started, and returned to the pool as operations complete. Likewise, the devices in the LSS can be switched by the customer back to the original mode of operation where aliases are statically assigned to base addresses. In this way, the operating system may transition in and out of the mode where alias addresses are dynamically assigned and used to a mode where they are statically assigned and used.

In the illustrated embodiment of FIG. 2, the UCB information 50 provides a chain of UCBs 52a, 52b . . . 52n for one processing system 4a, 4b . . . 4n and one LSS 32 configured in the storages 18a, 18b . . . 18n, where each UCB 52a, 52b . . . 52n includes information for one volume. In alternative embodiments, the UCB information 50 may include different information for different storage systems and environments to provide information on base and alias addresses assigned to volumes configured in the storages 18a, 18b . . . 18n. Further, if the system is not implementing channel subsystem technology, then information on the subchannel, such as field 60 may not be included.

Figure 3:
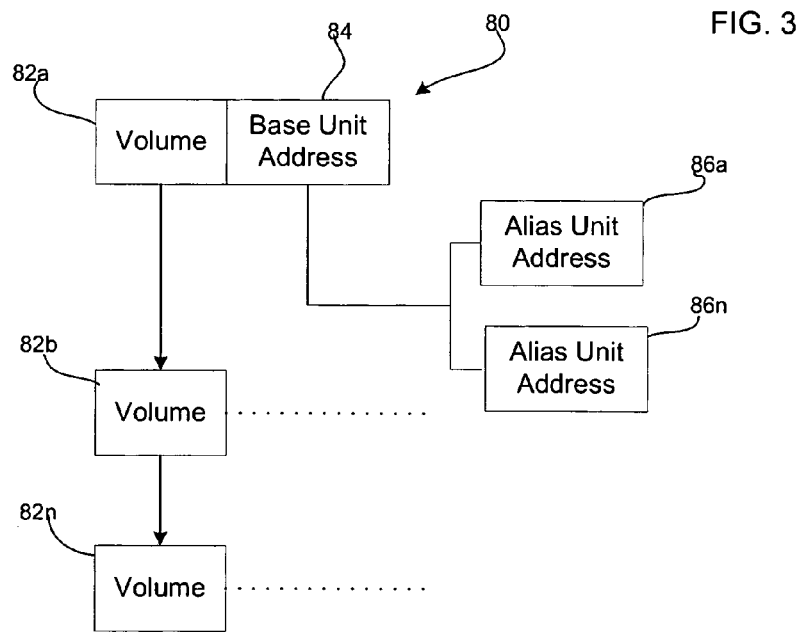
FIGS. 3 and 5 illustrate embodiments of information a control unit maintains to allow a host to access volumes managed by the control unit.

FIG. 3 illustrates an embodiment of control unit address information 80 having information on the assignment of base and alias addresses for one processing system 4a, 4b . . . 4n and logical subsystem 32 configured in the storages 18a, 18b . . . 18n. An instance of the information 50 would be maintained for each separate processing system 4a, 4b . . . 4n and each logical subsystem (LSS) that the processing system 4a, 4b . . . 4n may access. The address information 80 includes an entry 82a . . . 82n for each volume 34 configured in the logical subsystem (LSS) 32 for which the information 80 is maintained. The instances of the control unit address information 80 comprise the control unit address information 28. Each entry 82a, 82b . . . 82n (FIG. 3) includes: a volume identifier 84; the base address 86 assigned to the volume; and zero or more alias addresses 86a . . . 86n that may be assigned to the base address 84 to additionally use to access the volume.

Figure 4:
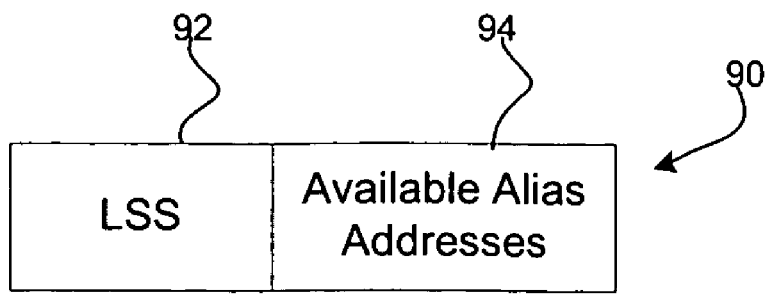

FIG. 4 illustrates an embodiment of processing system storage pool information 90 maintained for one processing system 4a, 4b . . . 4n and one logical subsystem (LSS) 32. The instance of the processing system storage pool information 90 includes, for one processing system 4a, 4b . . . 4n, the logical subsystem (LSS) 92 to which the information applies and the available alias addresses 94 that may be assigned to volumes configured within the LSS 92. The instances 90 of the processing system storage pool information for each LSS 32 the processing systems 4a, 4b . . . 4n may access comprises the alias storage pool information 22.

Figure 5:
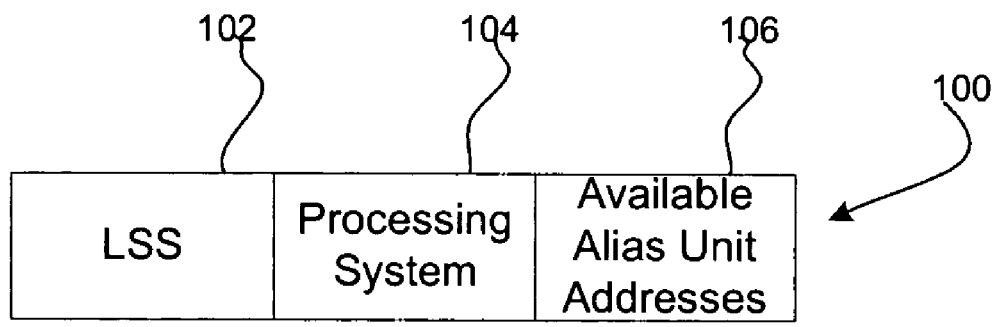

FIG. 5 illustrates an embodiment of control unit storage pool information 100 maintained for one logical subsystem (LSS) 32 and one processing system 4a, 4b . . . 4n. The instance of the control unit system storage pool information 90 includes, for one processing system 4a, 4b . . . 4n and logical subsystem 32, the logical subsystem (LSS) 102 and the processing system 104 to which the information applies and the available alias addresses 106 that may be assigned to volumes 34 configured within the LSS 102 for the processing system 104. In alternative embodiments, the storage pool information 90 may include different information for different storage systems and environments to provide information on base and alias addresses assigned to volumes configured in the storages 18a, 18b . . . 18n. The instances 100 of the processing system storage pool information for each LSS the processing systems may access comprises the control unit alias storage pool information 30.

Figure 6:
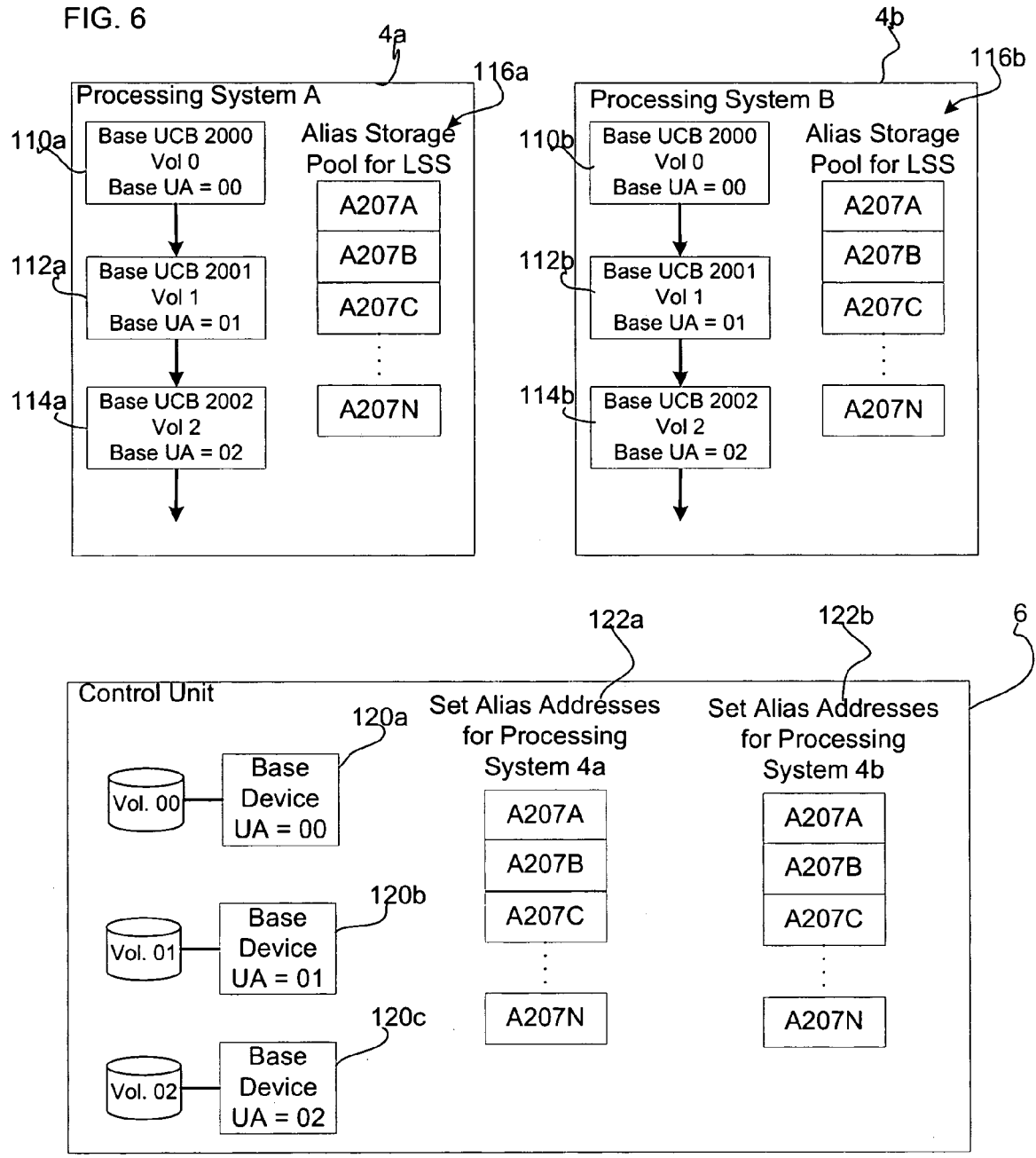
FIGS. 6 and 7 illustrate examples of how base and alias addresses may be assigned to volumes within host processing systems and a control unit.

FIG. 6 illustrates an example of the processing systems 4a, 4b . . . 4n and control unit 6 maintaining information on an initial assignment of base addresses to volumes and alias addresses to storage pools. The control unit 6 may generate this initial configuration and communicate the information to processing systems 4a, 4b . . . 4n. Each processing system 4a, 4b includes a plurality of UCBs 110a, 112a, 114a and 110b, 112b, 114b having information on volumes 0, 1 and 2 assigned base unit addresses of 00, 01, and 02. Each processing system 4a, 4b further maintains one alias storage pool 116a, 116b for each LSS 32 having the available alias addresses that may be assigned to base addresses, e.g., A207A . . . A207N, for the volumes 34 in that LSS 32. In the described embodiment, each processing system 4a, 4b storage pool 116a, 116b has the same alias addresses to use. In an alternative embodiment, different sets of alias addresses may be assigned to different processing systems 4a, 4b . . . 4n. The control unit 6 also maintains base unit address information 120a, 120b, 120c for each volume 0, 1, and 2 in the logical subsystem (LSS) 32 and a set of alias addresses 122a, 122b for each processing system 4a, 4b and LSS 32. As discussed, the control unit 6 may use the same alias address numbers for different processing systems 4a, 4b, or alternatively have some or all different alias addresses for different processing systems 4a, b. Although information for only two processing systems 4a, 4b are shown, the control unit 6 may maintain information for all processing systems in all host systems having access to the storages 18a, 18b . . . 18n and logical subsystems 32 and volumes 34 configured therein.

Figure 7:
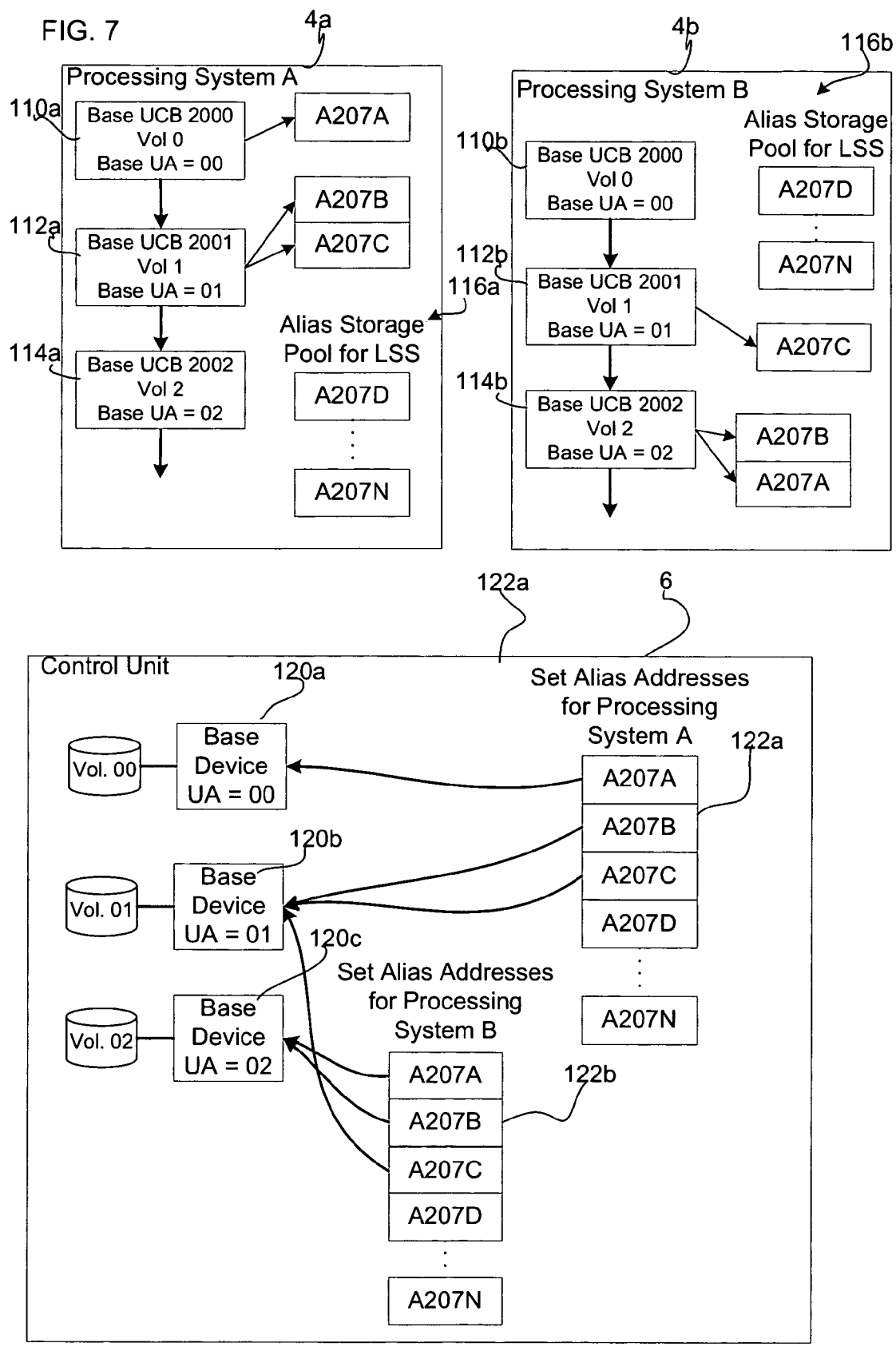

FIG. 7 illustrates an example of how alias addresses may be assigned to base addresses during runtime. Alias addresses may be assigned as needed (when an I/O operation arrives and needs to start) and released as soon as the I/O operation completes. In processing system 4a, alias addresses are assigned to base addresses 10a and 112a for volumes 0 and 1, respectively and, in processing system 4b, the same alias address area assigned to different volumes 1 and 2 than the assignment for processing system 4a. The control unit 6 is shown as maintaining information on this new assignment of the same alias addresses for the different processing systems 4a, 4b.

Figure 8:
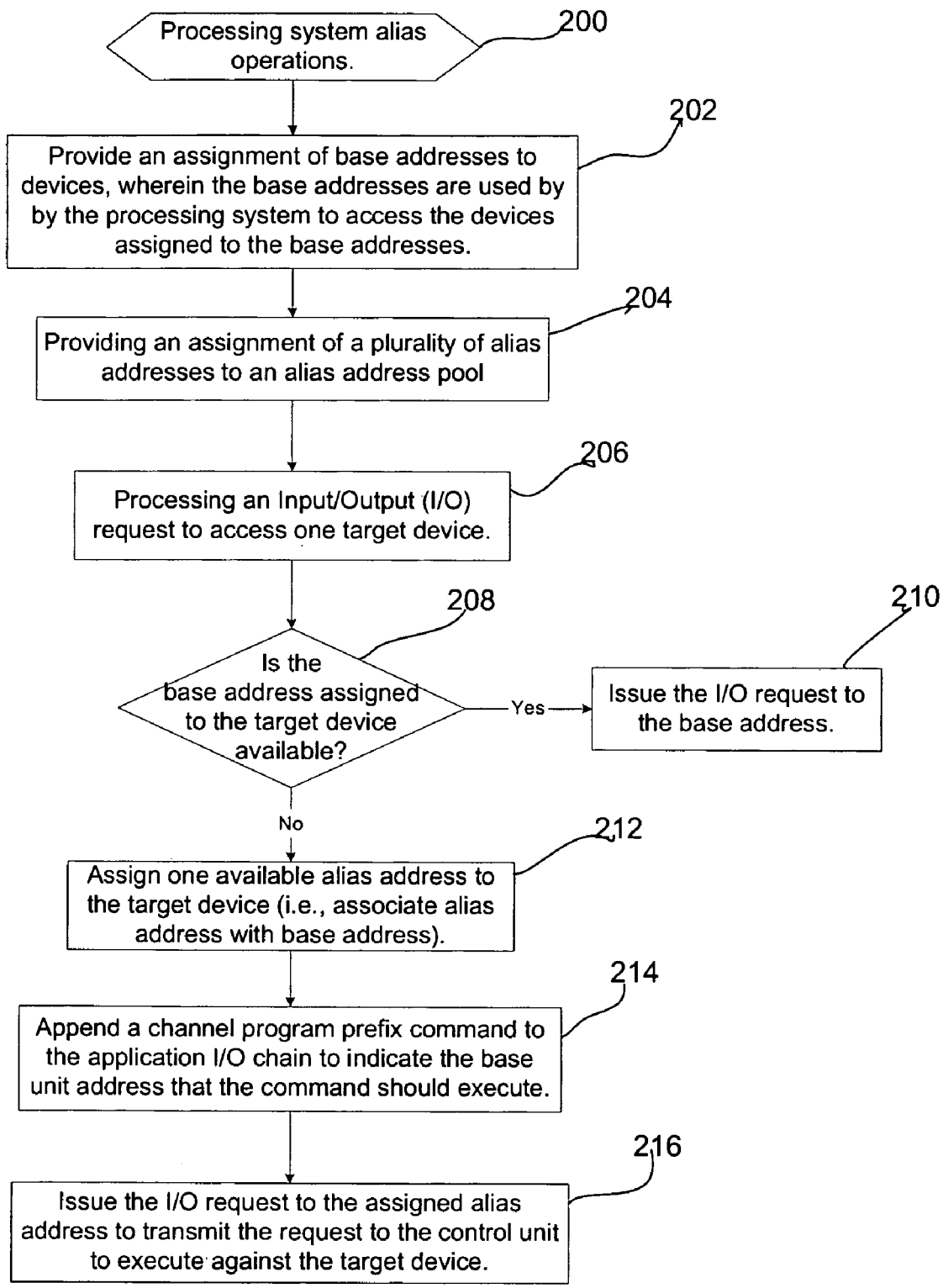
FIGS. 8, 9, and 10 illustrate embodiments of host operations to use base and alias addresses to access volumes.

FIG. 8 illustrates an embodiment of operations implemented in the operating system 5 to perform (at block 200) processing system alias operations, wherein a host 2 may include one or more processing systems. An assignment is maintained (at block 202) of base addresses 62 for the UCBs 52a, 52b . . . 52n to devices 58 (FIG. 2), such as volumes, wherein the base addresses are used by the processing system 4a, 4b . . . 4n to access the volumes 34 configured in the storages 18a, 18b . . . 18n. An assignment is also maintained (at block 204) of a plurality of alias addresses 94 to an alias address pool, e.g., the alias storage pool information 22 for one processing system 4a, 4b . . . 4n and LSS 32 including volumes 34 that may be accessed using the alias addresses 94. Upon processing (at block 206) an Input/Output (I/O) request to access one target device, e.g., volume 34, if (at block 208) the base address 62 assigned to the target device (volume) 58 is available, then the I/O request is issued (at block 210) to the target device (volume) 58. Otherwise, if (at block 208) the base address 62 is not available, one available alias address 94 in the storage pool for the processing system 4a, 4b and LSS 34 including the target volume 58 is assigned (at block 212) to the target device (volume) 58 to associate the available alias address, e.g., 64a . . . 64n, with the base address 62 for the target volume 58. The operating system 5 appends (at block 214) a command, e.g., channel program prefix command, to the application I/O request, e.g., I/O chain, to indicate the base unit address for which the alias address should be assigned. The I/O request is issued (at block 216) to the assigned alias address to transmit the request to the control unit 6 to execute against the target device, e.g., volume. In one embodiment, the operations of blocks 214 and 216 may be performed as one operation. In CCW embodiments, when the operating system 5 starts an I/O operation to disk, the CCW chain is prefixed with a command that provides security (allowed extent range the CCW chain is allowed to access), cache hints, optional timestamps for Asynchronous Remote Copy (XRC), etc. The unit address of the base may be set in the prefix command to an alias in order to tell the control unit 6 the logical volume/base address associated with the operation. So, the prefix CCW command may provide the assignment of alias to base addresses.

In one embodiment, the host operating system 5 may enable the control unit 6 to receive the initial command and its data before signaling back to the channel subsystem 8. Thus, the control unit 6 can determine the volume (base) with which the alias needs to be associated. If the volume (base) is reserved to another processing system, e.g., LPAR, then device busy status can be returned, else, the operation can be started. The operating system may only select to choose an alias address when the base is inaccessible and if the application issuing the I/O request application allows the streaming of I/O requests using alias addresses.

Figure 9:
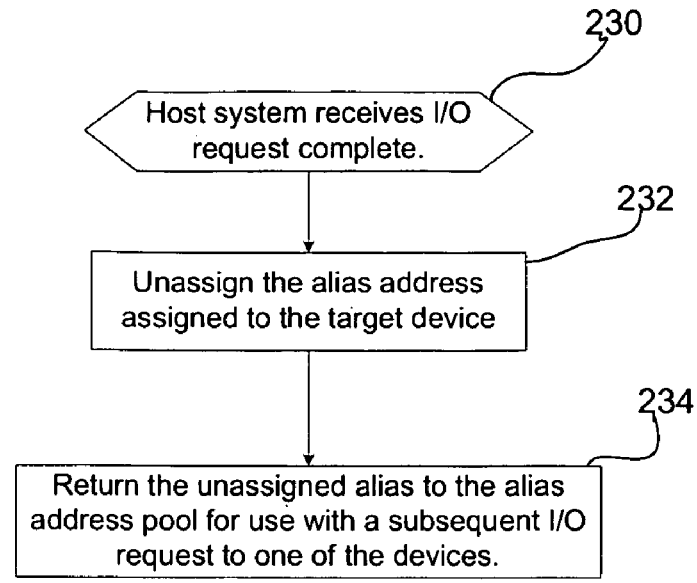

FIG. 9 illustrates an embodiment of operations implemented in the operating system 5 to process an I/O request complete message from the control unit 6. In response (at block 230) to the complete message, the channel subsystem program 16 unassigns (at block 232) the alias address 64a . . . 64n assigned to the target device, volume 58, to which the request completed. The unassigned alias is returned (at block 234) to the alias address pool 94 (for the LSS 32 including the target volume 34 and processing system 4a, 4b . . . 4n that issued the request) for use with a subsequent I/O request from the processing system to one of the devices, e.g., volumes 34 in that LSS 32.

Figure 10:
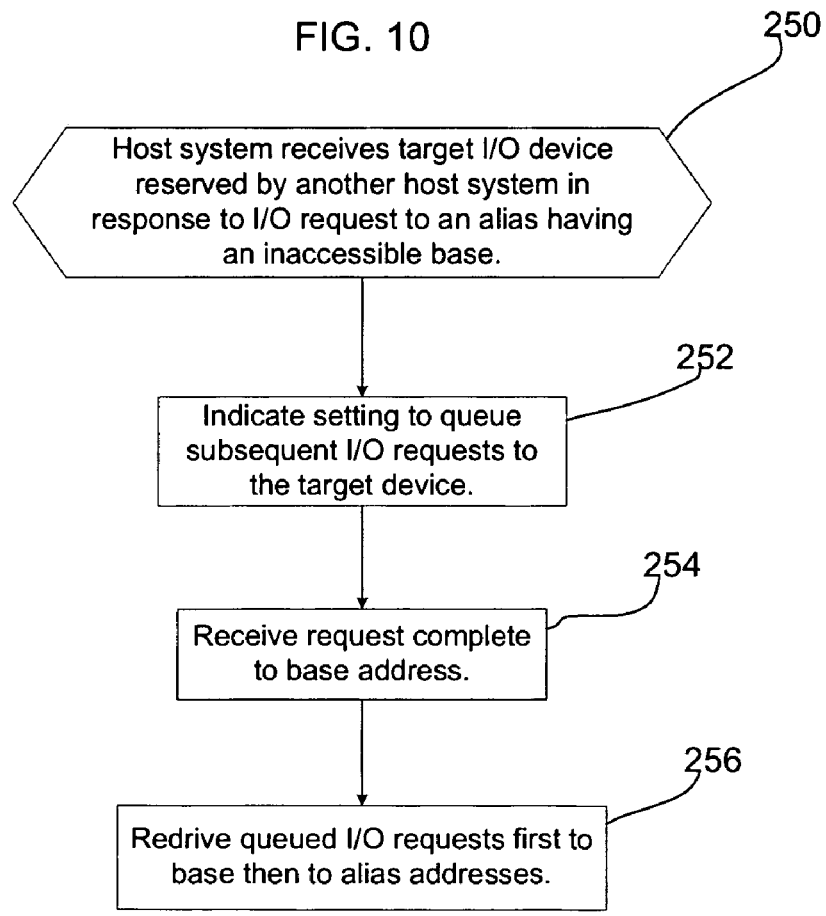

FIG. 10 illustrates an embodiment of operations performed by the operating system 5 in response to receiving (at block 250) a message that the target device, e.g., volume, is inaccessible in response to the I/O request to an alias address having an inaccessible base. A volume is inaccessible if it is reserved by another host or processing system or if there is a "long busy" against the volume (device status indicating unit check and sense data indicating "intervention required"). In response to this message indicating inaccessibility, a setting is indicated (at block 252) to queue subsequent I/O requests to the target device (volume). Upon subsequently receiving (at block 254) a request complete to the base address for which the inaccessible (e.g., reserved or long busy) status was received, the operating system 5 redrives (at block 256) queued I/O requests first to the base address and then to the alias addresses.

Figure 11:
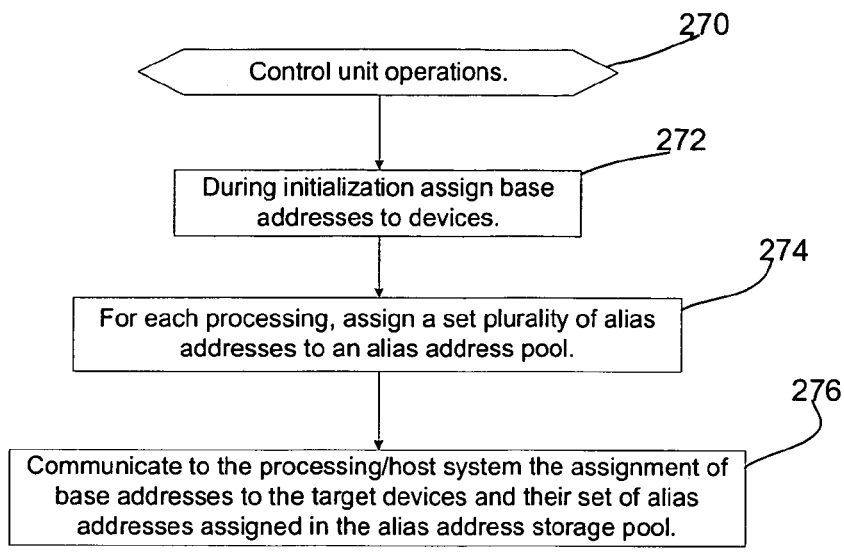
FIGS. 11 and 12 illustrate embodiments of control unit operations to allow a host to access volumes managed by the control unit.

FIG. 11 illustrates an embodiment of control unit 6 operations implemented in the I/O manager 24 code to manage alias addresses. As part of these operations (at block 270), during initialization the I/O manager 24 assigns (at block 272) base addresses 84 to devices 82a, 82b . . . 82n (FIG. 3) and for each processing system 4a, 4b (indicated in field 104 of FIG. 5) and LSS 32 (indicated in field 102 of FIG. 5) configured in the storages 18a, 18b . . . 18n, assigns (at block 274) a set plurality of alias addresses 106 to an alias address pool 100 (FIG. 5). The I/O manager 24 then communicates (at block 276) to the processing system channel subsystem program 16 the assignment of base addresses 84 to the target devices 82a, 82b . . . 28n and their set of alias addresses 106 assigned in the alias address storage pool 100.

In one embodiment, the relationship of aliases to pools and bases to alias pools is accomplished through self description information passed from the control unit 6 to the operating system 5 for each unit address. The information consists of an alias management group identifier. Alias addresses that provide the same alias management group identifier are allowed to be in the same alias pool and base unit addresses with the same alias management group identifier are allowed to be assigned aliases from that alias pool. In a further embodiment, the operating system may take a subset of the alias management groups indicated by the control unit and form smaller subsets.

Figure 12:
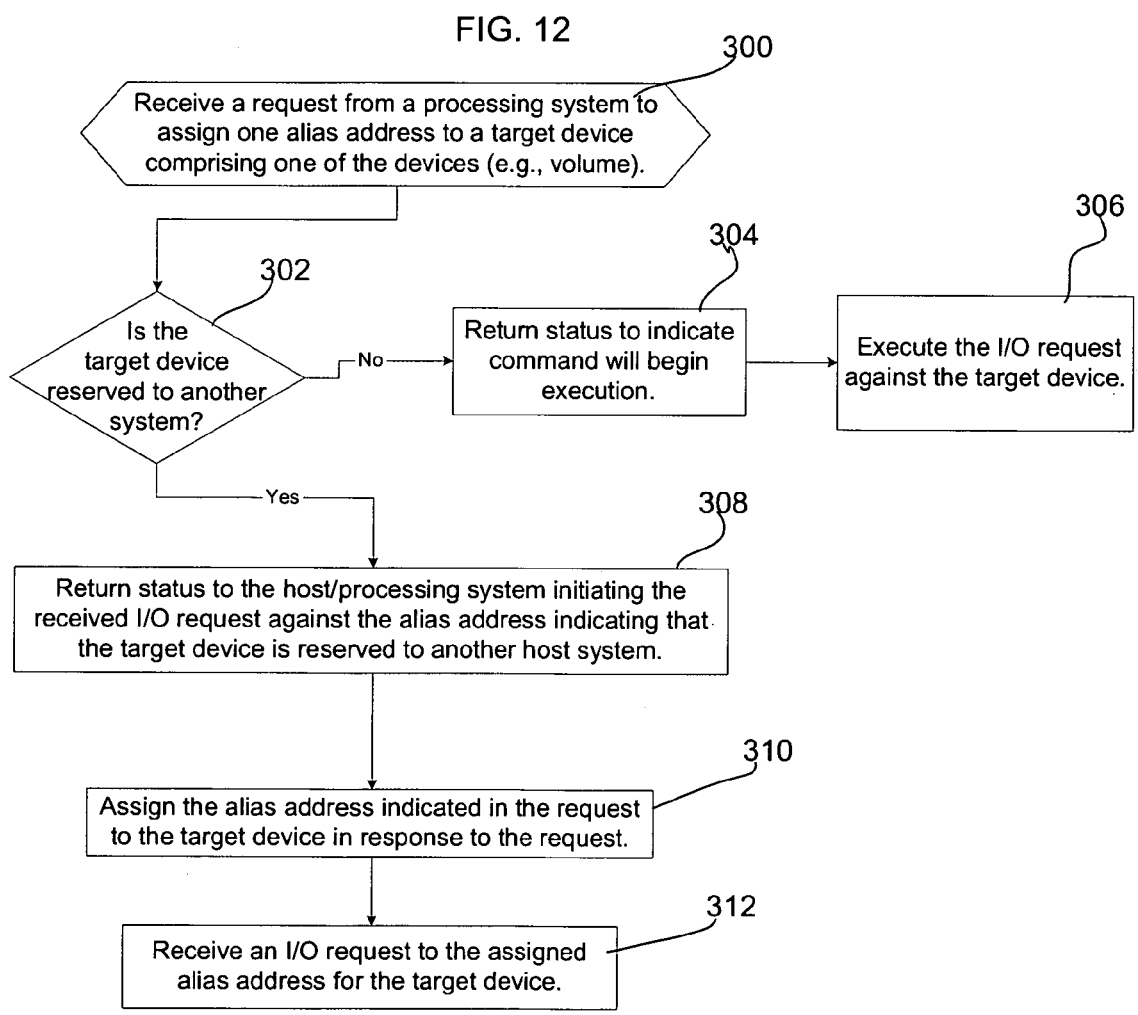

FIG. 12 illustrates an embodiment of operations implemented in the I/O manager 24 to process certain requests from a host channel subsystem 8 when alias addresses are dynamically assigned and used from a storage pool. In response to receiving (at block 300) a request from a processing system 4a, 4b . . . 4n to assign one alias address to a target device, e.g., volume 34 in an LSS 32, the I/O manager 24 determines (at block 302) whether the target device (volume) addressed by the base address is not reserved to another system (or otherwise inaccessible). If not, then the I/O manager 32 returns (at block 304) status to indicate command will begin execution and then executes (at block 306) the I/O request. In the IBM ESS environment, the return may comprise a status with zero initial status (which may be presented in an Initial Command Response (CMR) frame). If (at block 302) the target volume is reserved to another processing system/host (or otherwise unavailable), then the I/O manager 24 returns (at block 308) status to the host/processing system initiating the received I/O request against the alias address indicating that the target device (e.g., volume) is reserved to another host/processing system. In the IBM ESS environment, this returned status at block 308 may comprise an xD5 status sent in a status frame.

The I/O manager then assigns (at block 310) the alias address, e.g., 86a . . . 86n (FIG. 3) indicated in the request to the target device, e.g., volume 82a . . . 82n. The assigned alias address may be removed from the available alias addresses 106 indicated in the alias storage pool 100 for the identified LSS 102 and processing system 104. The I/O manager 24 may now receive (at block 312) an I/O request to the assigned alias address for the target device, e.g., volume.

In one embodiment, the host operating system 5 may enable the control unit 6 to receive the initial command and its data before signaling back to the channel subsystem 8. Thus, the control unit 6 can determine the volume (base) which the alias needs to be associated with. If the volume is reserved to another processing system, e.g., LPAR, then device busy status can be returned, else, the operation can be started.

Described embodiments provide a technique to maintain alias addresses available for use with different volumes/base addresses as needed. After an I/O request to an alias address completes with respect to a volume, that alias address is returned to the alias address storage pool to be used with other volumes in an LSS for one processing system. Further, in certain embodiments, separate pools of alias addresses may be provided for each processing system and LSS, such that for one LSS, different processing systems may assign the same or different alias addresses to different volumes. This conserves alias addresses by allowing one alias address to be used by different processing systems to access the same or different volumes. The described embodiments conserve alias addresses resources and allows their dynamic assignment and reuse during runtime operations.

Additional Embodiment Detail

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment-with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

Further, when a reference letter, such as "a", "b", or "n" is used to denote a certain number of items, the reference "a", "b" or "n" used with different elements may indicate the same or different number of such elements.

FIGS. 2, 3, 4, and 5 show information maintained in a certain format. In alternative embodiments, the information shown in these figures may be maintained in alternative data structures and formats, and in different combinations.

The illustrated operations of FIGS. 8, 9, 10, 11, and 12 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage medium including code, wherein the code is executed to communicate with a control unit managing access to devices and perform operations, the operations comprising:

providing an assignment of base addresses to a group of devices, wherein the base addresses are used to access the devices assigned to the base addresses;

transmitting a first command to the control unit to instruct the control unit to operate in a dynamic mode where alias addresses are assigned to an alias address pool associated with the group of devices, wherein the alias addresses in the alias address pool are not assigned to one of the devices in the group to use as an alias address and are available to be dynamically assigned to one of multiple of the devices in the group to service I/O (Input/Output) requests to the devices in response to the I/O requests;

processing an I/O request to access one target device comprising one of the group of devices;

determining whether the base address assigned to the target device is available;

assigning one alias address in the alias address pool not assigned as an alias address to one of the devices in the group to the target device in response to determining that the base address is not available and when operating in the dynamic mode where alias addresses are assigned to the alias address pool;

issuing the I/O request to the assigned alias address to transmit the request to the target device; and transmitting a second command to the control unit to operate in a static mode where alias addresses are statically assigned to the base addresses.

2. The article of manufacture of claim 1, wherein the operations further comprise:

unassigning the alias address assigned to the target device in response to completing the I/O request; and returning the unassigned alias address to the alias address pool for use with a subsequent I/O request to one of the devices.

3. The article of manufacture of claim 1, wherein assigning one alias address to the target device comprises associating the alias address with the base address of the target device.

4. The article of manufacture of claim 1, wherein assigning one alias address to the target device comprises requesting a control unit managing access to the devices to assign the alias address to the target device, wherein the control unit updates internal data structures to indicate the assignment of the alias address to the target device.

5. The article of manufacture of claim 1, wherein the group of devices comprises a logical subsystem, and wherein the devices in the group of devices comprise volumes configured within the logical subsystem, wherein the code is executed to communicate with independent processing systems, wherein each processing system maintains separate connections to a control unit managing access to the volumes, wherein each processing system maintains a data structure indicating an assignment of base addresses to volumes and alias addresses to a storage pool, wherein the storage pools used by the processing systems have the same alias addresses to access the volumes.

6. The article of manufacture of claim 1, further comprising:
receiving status indicating that the target device is reserved in response to issuing the I/O request to the assigned alias address; and
queuing subsequent I/O requests to the target device in response to receiving the status.

7. The article of manufacture of claim 6, further comprising:
receiving status indicating that the target device is available; and
assigning alias addresses from the alias address pool to the target device to use for I/O requests queued for the target device in response to receiving status that the target device is no longer reserved.

8. The article of manufacture of claim 6, wherein the status indicating that the target device is available comprises status indicating that the base address for the target device is available, further comprising:
reissuing the I/O requests to the base address and the alias address that were delayed in response to receiving the status that the target device is no longer reserved.

9. The article of manufacture of claim 1, wherein the association of alias and base addresses with an alias address pool is determined by an assignment from the control unit of an alias assignment group number for each base or alias address, wherein base and alias addresses associated with the same alias management group number are associated with the same alias address pool.

10. The article of manufacture of claim 9, wherein the operations further comprise:
subdividing the alias management group numbers identified by the control unit into multiple subsets of subsets of the alias management group numbers to create multiple alias address pools.

11. An article of manufacture comprising a computer readable storage medium including code, wherein the code is executed to communicate with a host system and devices, and perform operations, the operations comprising:
assigning base addresses to a group of devices, wherein the base addresses are used by the host system to access the devices assigned to the base addresses;
receiving a first command from the host system to operate in a dynamic mode where alias addresses are assigned to an alias address pool;
assigning a plurality of alias addresses to an alias address pool associated with the group of devices in response to receiving the first command from the host system to operate in the dynamic mode where alias addresses are assigned to the alias address pool, wherein the alias addresses in the alias address pool are not assigned to one of the devices in the group to use as an alias address and are available to be dynamically assigned to one of multiple of the devices in the group to service Input/Output (I/O) requests to the devices in response to the I/O requests;
communicating to the host system the assignment of base addresses to the target devices and the alias addresses to the alias address pool;
receiving a request from the host system to assign one alias address to a target device comprising one of the devices;
assigning the alias address indicated in the request to the target device in response to the request;
receiving an I/O request to the assigned alias address for the target device;
executing the I/O request against the target device to which the alias address is assigned; and
receiving a second command from the host system to operate in a static mode where alias addresses are statically assigned to the base addresses.

12. The article of manufacture of claim 11, wherein the host system includes independent processing systems, each maintaining separate connections to the devices, wherein assigning the alias addresses to the alias address pool further comprises:
assigning to each processing system in the host system a set of alias addresses in the alias address pool, wherein the sets of alias addresses for different processing systems have the same alias addresses; and
communicating to each processing system the set of alias addresses assigned to that processing system.

13. The article of manufacture of claim 12, wherein a same or different alias addresses in different sets of alias addresses in the alias address pool can be assigned to the processing systems associated with those sets to access one device or different devices.

14. The article of manufacture of claim 12, wherein the group of devices comprises a logical subsystem, and wherein the devices in the group of devices comprise volumes configured within the logical subsystem, wherein each processing system maintains a plurality of connections to the logical subsystem identified by a path group identifier, wherein assigning one set of alias addresses to one processing system comprises associating the set of alias addresses with the path group identifier of the logical subsystem and processing system.

15. The article of manufacture of claim 11, wherein the operations further comprise:
determining whether one target device is inaccessible in response to receiving one I/O request to the alias address assigned to the target device; and
returning status to the host system initiating the received I/O request against the alias address indicating that the target device is inaccessible.

16. The article of manufacture of claim 11, wherein the computer readable storage medium including the code is within a control unit, wherein the association of alias and base addresses with an alias address pool is determined by an assignment from the control unit of an alias assignment group number for each base or alias address, wherein base and alias addresses associated with the same alias management group number are associated with the same alias address pool, wherein the operations further comprise:
subdividing the alias management group numbers identified by the control unit into multiple subsets of subsets of the alias management group numbers to create multiple alias address pools.

17. A system in communication with a control unit managing access to devices, comprising:
a processor;
a computer readable medium including:
an assignment of base addresses to a group of devices, wherein the base addresses are used to access the devices assigned to the base addresses;
an assignment of a plurality of alias addresses to an alias address pool associated with the group of devices, wherein the alias addresses in the alias address pool are not assigned to one of the devices in the group to use as an alias address and are available to be dynamically assigned to one of multiple of the devices in the group to service Input/Output (I/O) requests to the devices in response to the I/O requests;

code implemented in the computer readable medium that is executed by the processor to perform operations, comprising:

transmitting a first command to the control unit to instruct the control unit to operate in a dynamic mode where alias addresses are assigned to an alias address pool associated with the group of devices;

processing an I/O request to access one target device comprising one of the devices;

determining whether the base address assigned to the target device is available;

assigning one alias address in the alias address pool not assigned as an alias address to one of the devices in the group to the target device in response to determining that the base address is not available and when operating in the dynamic mode where alias addresses are assigned to the alias address pool;

issuing the I/O request to the assigned alias address to transmit the request to the control unit to execute against the target device; and transmitting a second command to the control unit to operate in a static mode where alias addresses are statically assigned to the base addresses.

18. The system of claim 17, wherein the code is further capable of being executed to perform operations comprising:

unassigning the alias address assigned to the target device in response to completing the I/O request; and returning the unassigned alias address to the alias address pool for use with a subsequent I/O request to one of the devices.

19. The system of claim 17, wherein assigning one alias address to the target device comprises issuing a request to the control unit to assign the alias address to the target device, wherein the control unit updates internal data structures to indicate the assignment of the alias address to the target device.

20. The system of claim 17, wherein the group of devices comprises a logical subsystem, and wherein the devices comprise volumes configured within a logical subsystem, further comprising:

processing systems, wherein each processing system comprises:

separate connections to the control unit managing access to the volumes;

a data structure indicating an assignment of base addresses to volumes and alias addresses to a storage pool, wherein the storage pools used by the processing systems have the same alias addresses to access the volumes.

21. The system of claim 17, wherein the association of alias and base addresses with an alias address pool is determined by an assignment from the control unit of an alias assignment group number for each base or alias address, wherein base and alias addresses associated with the same alias management group number are associated with the same alias address pool, wherein the operations further comprise:

subdividing the alias management group numbers identified by the control unit into multiple subsets of subsets of the alias management group numbers to create multiple alias address pools.

22. A system managing access to devices and in communication with a host system, comprising:

a processor;

code implemented in a computer readable medium that is executed by the processor to perform operations, the operations comprising:

assigning base addresses to a group of devices, wherein the base addresses are used by the host system to access the devices assigned to the base addresses;

receiving a first command from the host system to operate in a dynamic mode where alias addresses are assigned to an alias address pool;

assigning a plurality of alias addresses to an alias address pool associated with the group of devices in response to receiving the first command from the host system to operate in the dynamic mode where alias addresses are assigned to the alias address pool, wherein the alias addresses in the alias address pool are not assigned to one of the devices in the group to use as an alias address and are available to be dynamically assigned to one of multiple of the devices in the group to service Input/Output (I/O) requests to the devices in response to the I/O requests;

communicating to the host system the assignment of base addresses to the target devices and the alias addresses to the alias address pool;

receiving a request from the host system to assign one alias address to a target device comprising one of the devices;

assigning the alias address indicated in the request to the target device in response to the request;

receiving an I/O request to the assigned alias address for the target device;

executing the I/O request against the target device to which the alias address is assigned; and receiving a second command from the host system to operate in a static mode where alias addresses are statically assigned to the base addresses.

23. The system of claim 22, wherein the host system includes independent processing systems, each maintaining separate connections to the devices, wherein assigning the alias addresses to the alias address pool further comprises:

assigning to each processing system in the host system a set of alias addresses in the alias address pool, wherein the sets of alias addresses for different processing systems have the same alias addresses; and communicating to each processing system the set of alias addresses assigned to that processing system.

24. The system of claim 23, wherein a same or different alias addresses in different sets of alias addresses in the alias address pool can be assigned to the processing systems associated with those sets to access one device or different devices.

25. The system of claim 23, wherein the group of devices comprises a logical subsystem, and wherein the devices in the group of devices comprise volumes configured within the logical subsystem, wherein each processing system maintains a plurality of connections to the logical subsystem identified by a path group identifier, wherein assigning one set of alias addresses to one processing system comprises associating the set of alias addresses with the path group identifier of the logical subsystem and processing system.

26. The system of claim 22, wherein the system comprises a control unit, wherein the association of alias and base addresses with an alias address pool is determined by an assignment from the control unit of an alias assignment group number for each base or alias address, wherein base and alias addresses associated with the same alias management group number are associated with the same alias address pool, wherein the operations further comprise:

subdividing the alias management group numbers identified by the control unit into multiple subsets of subsets of the alias management group numbers to create multiple alias address pools.

27. A computer implemented method, comprising:

providing an assignment of base addresses to a group of devices, wherein the base addresses are used by a host system to access the devices assigned to the base addresses;

transmitting a first command to the control unit to instruct the control unit to operate in a dynamic mode where alias addresses are assigned to an alias address pool associated with the group of devices, wherein the alias addresses in the alias address pool are not assigned to one of the devices in the group to use as an alias address and are available to be dynamically assigned to one of multiple of the devices in the group to service Input/Output (I/O) requests to the devices in response to the I/O requests;

processing an I/O request to access one target device comprising one of the group of devices;

determining whether the base address assigned to the target device is available;

assigning one alias address in the alias address pool not assigned as an alias address to one of the devices in the group to the target device in response to determining that the base address is not available and when operating in the dynamic mode where alias addresses are assigned to the alias address pool;

issuing the I/O request to the assigned alias address to transmit the request to the target device; and transmitting a second command to the control unit to operate in a static mode where alias addresses are statically assigned to the base addresses.

28. The method of claim 27, further comprising:
unassigning the alias address assigned to the target device in response to completing the I/O request; and
returning the unassigned alias address to the alias address pool for use with a subsequent I/O request to one of the devices.

29. The method of claim 27, wherein the group of devices comprises a logical subsystem, and wherein the devices in the group of devices comprise volumes configured within the logical subsystem, wherein the host system includes independent processing systems, wherein each processing system maintains separate connections to a control unit managing access to the volumes, wherein each processing system maintains a data structure indicating an assignment of base addresses to volumes and alias addresses to a storage pool, wherein the storage pools used by the processing systems have the same alias addresses to access the volumes.

30. The method of claim 27, further comprising:
receiving status indicating that the target device is reserved in response to issuing the I/O request to the assigned alias address; and
queuing subsequent I/O requests to the target device in response to receiving the status.

31. The method of claim 27, wherein the association of alias and base addresses with an alias address pool is determined by an assignment from the control unit of an alias assignment group number for each base or alias address, wherein base and alias addresses associated with the same alias management group number are associated with the same alias address pool, further comprising:
subdividing the alias management group numbers identified by the control unit into multiple subsets of subsets of the alias management group numbers to create multiple alias address pools.

32. A computer implemented method, comprising:
assigning base addresses to a group of devices, wherein the base addresses are used by a host system to access the devices assigned to the base addresses;
receiving a first command from the host system to operate in a dynamic mode where alias addresses are assigned to an alias address pool;
assigning a plurality of alias addresses to an alias address pool associated with the group of devices in response to receiving the first command from the host system to operate in the dynamic mode where alias addresses are assigned to the alias address pool, wherein the alias addresses in the alias address pool are not assigned to one of the devices in the group to use as an alias address and are available to be dynamically assigned to one of multiple of the devices in the group to service Input/Output (I/O) requests to the devices in response to the I/O requests;
communicating to the host system the assignment of base addresses to the target devices and the alias addresses to the alias address pool;
receiving a request from the host system to assign one alias address to a target device comprising one of the devices;
assigning the alias address indicated in the request to the target device in response to the request;
receiving an I/O request to the assigned alias address for the target device;
executing the I/O request against the target device to which the alias address is assigned; and
receiving a second command from the host system to operate in a static mode where alias addresses are statically assigned to the base addresses.

33. The method of claim 32, wherein the host system includes independent processing systems, each maintaining separate connections to the devices, wherein assigning the alias addresses to the alias address pool further comprises:
assigning to each processing system in the host system a set of alias addresses in the alias address pool, wherein the sets of alias addresses for different processing systems have the same alias addresses; and
communicating to each processing system the set of alias addresses assigned to that processing system.

34. The method of claim 33, wherein a same or different alias addresses in different sets of alias addresses in the alias address pool can be assigned to the processing systems associated with those sets to access one device or different devices.

35. The method of claim 33, wherein the group of devices comprises a logical subsystem, and wherein the devices in the group of devices comprise volumes configured within the logical subsystem, wherein each processing system maintains a plurality of connections to the logical subsystem identified by a path group identifier, wherein assigning one set of alias addresses to one processing system comprises associating the set of alias addresses with the path group identifier of the logical subsystem and processing system.

36. The method of claim 32, further comprising:
determining whether one target device is inaccessible in response to receiving one I/O request to the alias address assigned to the target device; and
returning status to the host system initiating the received I/O request against the alias address indicating that the target device is inaccessible.

37. The method of claim 32, wherein the association of alias and base addresses with an alias address pool is determined by an assignment from a control unit of an alias assignment group number for each base or alias address, wherein base and alias addresses associated with the same alias management group number are associated with the same alias address pool, further comprising:
subdividing the alias management group numbers identified by the control unit into multiple subsets of subsets of the alias management group numbers to create multiple alias address pools.

\* \* \* \* \*